Feb. 24, 1953
J. C. LEWIS
2,629,634
VEHICLE WHEEL MOUNTING
Filed Sept. 12, 1949
2 SHEETS—SHEET 2
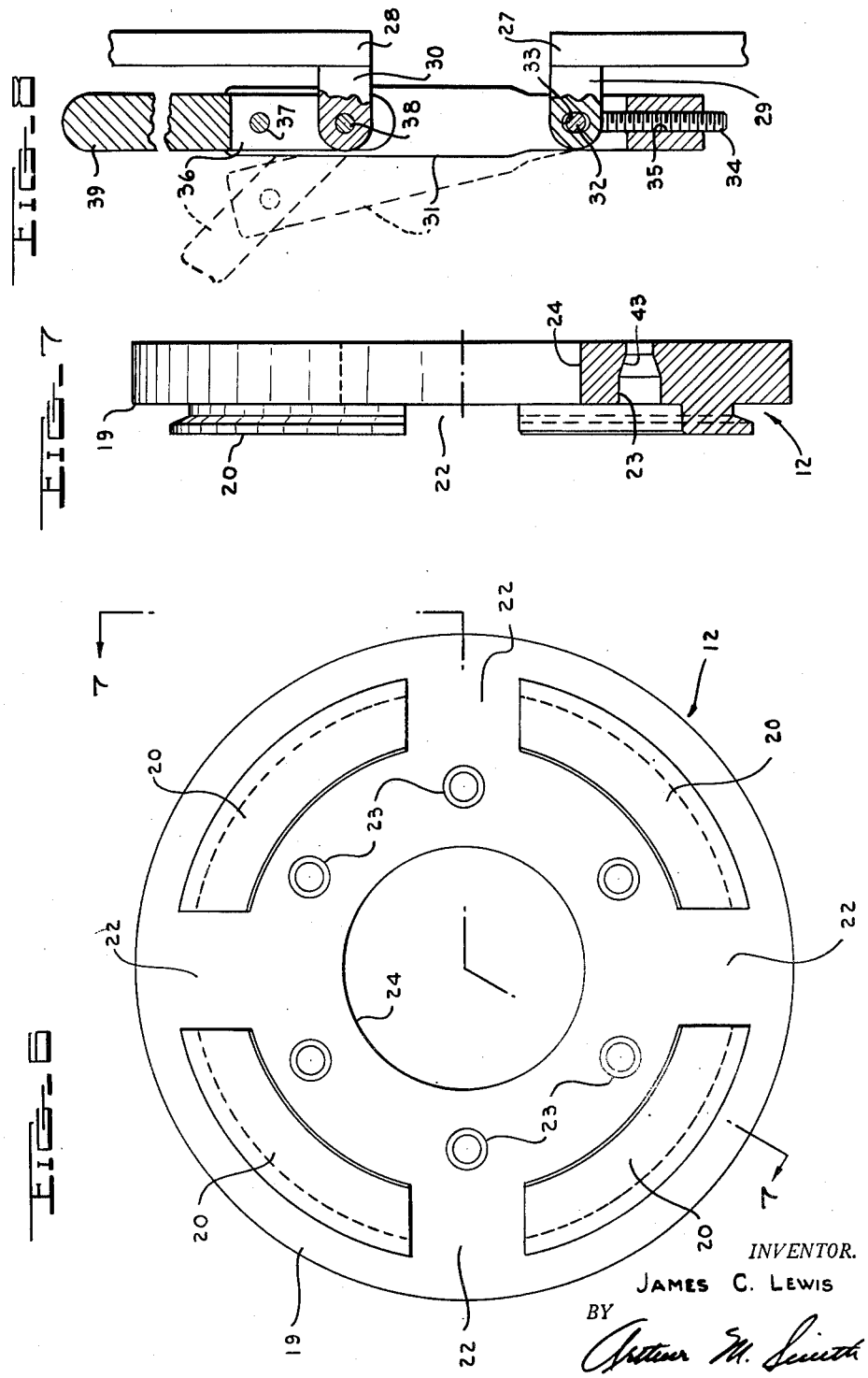
INVENTOR.
JAMES C. LEWIS
BY
Arthur M. Smith
ATTORNEY Patented Feb. 24, 1953

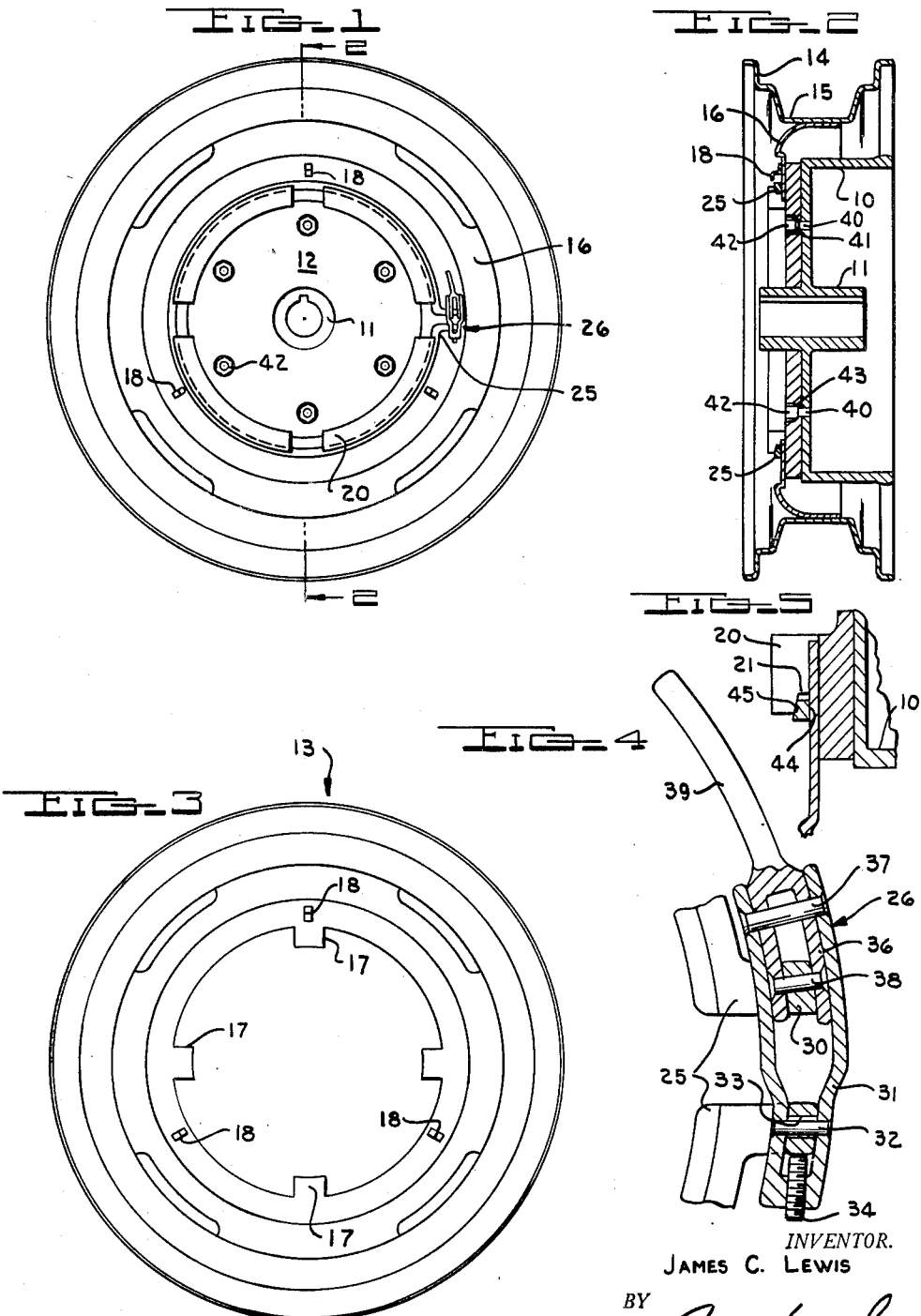

2,629,634

UNITED STATES PATENT OFFICE 2,629,634

VEHICLE WHEEL MOUNTING

James C. Lewis, Detroit, Mich.

Application September 12, 1949, Serial No. 115,166

4 Claims. (Cl. 301—6)

The present invention relates to new and useful improvements in a vehicle wheel mounting, and in particular to such a wheel mounting which utilizes a split locking ring and is adapted to be quickly and easily fitted to conventional vehicle wheel supports.

Prior to the present invention, demountable wheel constructions using a split ring for interlocking the wheel and wheel support have required altering the conventional wheel support or brake drum construction.

Further, previous means for adjusting the split locking ring and seating it firmly in place have not been efficient in assuring a positive sturdy locking effect in the ring when it is seated in place.

Accordingly, it is a principal object of the present invention to provide a vehicle wheel mounting which utilizes a split locking ring and which may be quickly and easily attached to a conventional wheel support or brake drum without altering the construction thereof.

It is another object of the present invention to provide a simple adaptor which may quickly and easily be installed on a conventional wheel support to adapt the support to receive a split locking ring type wheel.

It is a further object of the present invention to provide a vehicle wheel mounting which utilizes a split locking ring and wherein the locking ring cooperates with a ring seat so that one side of the ring is in a flat face contact and the other side of the ring is in a tapered contact to provide a wedge effect.

It is another object of the present invention to provide a vehicle wheel mounting which utilizes a split locking ring, and wherein an efficient extensible coupling adjoins the ends of the split ring, the coupling being adjustable either in the open or locked position.

It is another object of the present invention to provide a vehicle wheel mounting adapted for quick and simple wheel changes which is simple in construction and which is economical to manufacture.

It is another object of the present invention to provide a vehicle wheel mounting including an adaptor which will fit on a conventional wheel support, and a wheel including a split locking ring being adapted to contract into a ring seat provided on the adaptor when the extensible coupling is closed, and being adapted to seat in retaining brackets in the wheel when the coupling is in the open position.

Other objects of this invention will appear in the following description and appended claims, reference being had to the accompanying drawings forming a part of this specification wherein like reference characters designate corresponding parts in the several views.

In the drawings:

Fig. 1 is an outside elevation of a vehicle wheel mounting embodying the present invention and attached to a conventional wheel support.

Fig. 2 is a vertical section taken along the line 2—2 in the direction of the arrows, Fig. 1.

Fig. 3 is a side elevation of a wheel embodying the present invention, shown detached from the wheel support and with the split locking ring removed.

Fig. 4 is an outside elevation of the split locking ring extensible coupling with portions broken away for clarity.

Fig. 5 is a fragmentary section of the wheel mounting of the present invention, particularly showing the manner in which the split locking ring is disposed in the ring seat in the locked position.

Fig. 6 is an outside elevation of the adaptor of the present invention.

Fig. 7 is an elevation of the adaptor of the present invention taken along the line 7—7 in the direction of the arrows, Fig. 6.

Fig. 8 is a side elevation of the extensible coupling shown in Fig. 4, with the near portions of the ring clevises broken away to reveal the internal construction, and with the open position of the clevises shown in phantom.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The vehicle wheel mounting of the present invention is shown in the drawings, particularly Fig. 2, attached to a conventional wheel support or brake drum 10 having a hub portion 11 adapted for attachment to an axle.

The major parts of the device of the present invention are an adaptor 12, which is provided to adapt the mounting of the present invention to a conventional wheel support, and the wheel structure 13.

Referring to Figs. 2 and 3, the wheel 13 includes the tire retaining rim 14 and the tire seating channel 15. An annular web 16 is welded or otherwise suitably fastened to the base of the channel 15. A plurality of spaced driving lugs 17 extend radially inward from the web 16. Also spaced around the outer face of the web 16 are a plurality of snap ring retaining brackets 18.

A split locking ring 25, shown in Fig. 2, is provided within the retaining brackets 18 of the wheel 13 to prevent the ring 25 from slipping off or coming loose from the wheel assembly.

The adaptor 12, shown in detail in Fig. 6 includes the plate member 19 having an annular flange portion 20 extending outwardly therefrom. The annular flange 20 forms a ring seat 21, shown particularly in Fig. 5. The annular flange 20 is broken in portions to provide the slots 22 which are adapted to receive the driving lugs 17 of the wheel 13. Spaced countersunk holes are provided in the plate 19 of the adaptor 12 to receive lugs from a wheel support. A central hole 24 is provided to accommodate the hub of a conventional wheel support.

The extensible coupling 26 for the split locking ring 25 is shown in detail in Figs. 4 and 8. The free ends 27 and 28 of the split ring 25 are provided with bosses 29 and 30 extending perpendicularly therefrom. A clevis 31 is pivotally attached to the boss 29 by the pin 32. The hole 33 through which the pin 32 extends is larger in diameter than the said pin to allow adjustment by the adjusting screw 34. The adjusting screw 34 is disposed through the screw-threaded hole 35 at the back of the clevis 31. The forks of the clevis 31 are pivotally attached near their end portions to another clevis 36 by the pin 37. The clevis 36 is pivotally attached near the ends of the fork portions to the boss 30 by the pin 38 and at the other end is provided with a handle 39.

Referring now to Fig. 2 in particular, the wheel mounting of the present invention is attached to a conventional wheel support as follows:

The adaptor 12 is fitted to the drum 10 and the drum lugs 40 extend through the holes 23 in the adaptor plate 19. The hub 11 of the drum 10 extends through the central hole 24 in the adaptor plate 19. Copper washers 41 are placed over the lugs 40 and the lug nuts 42 are then tightened onto the lugs 40, the nuts 42 being seated in the countersunk portions 43 in the adaptor plate 19. The wheel 13 is then fitted into place over the adaptor 12 and drum 10. The driving lugs 17 of the wheel 13 engage the portions of the flange 20 adjacent the slots 22. The handle 39 which is in the position shown in phantom in Fig. 8 is moved inwardly to the solid line position shown in Figs. 4 and 8.

During this locking motion of the handle, the clevis 36 pivots downwardly about the pin 38 and the clevis 31 pivots about the pin 32. Due to the connection of the clevises 31 and 36 by the pin 37, the bosses 29 and 30 are pulled closer together. The ring 25 is pulled radially inward into the ring seat 21 in the adaptor 12. The screw 34 is then screwed inward to further seat the ring 25, and prevent accidental movement of the clevises to the open position.

To remove the wheel of the present invention, the screw 34 is backed off, the handle 39 is moved away from the wheel web 16 and the ring 25 is expanded back into the retaining brackets 18. The wheel 13 is then slipped off the adaptor 12 and drum 10.

By the present invention, applicant has provided a wheel mounting utilizing a wheel which contains an integral split locking ring construction, and wherein a conventional wheel support may be utilized with the wheel merely by securing the adaptor to the wheel support without altering the said support.

Another particular advantage is brought out in Fig. 5 where it is shown that one side of the locking ring 25 is flatly seated against the driving lug 17 at 44 and the other side of the locking ring 25 is in tapered engagement at 45 with the flange 20. Thus, when the locking ring 25 is contracted, one whole side of the ring is flatly seated at 44 and the other side is wedged against the flange 20 at 44. This provides a positive seating of the ring 25 with a maximum portion of the ring disposed in locking engagement against the flange 20 and driving lugs 17. In this construction, there is a minimum of wear of the parts since the parts are firmly and positively seated.

Another particular advantage of the vehicle wheel mounting of the present invention is the provision of the screw 34 which locks the extensible coupling 26 in place. The screw 34 may be quickly and easily moved inward or outward to positively lock the coupling 26 against accidental movement, or to unlock the coupling in order to remove the wheel.

Having thus described my invention, I claim:

1. A vehicle wheel mounting adapted for use with a conventional brake drum assembly having outwardly extending lugs and a central outwardly extending hub, comprising an adaptor and a wheel, said adaptor including a plate having spaced lug receiving holes and a central hub receiving hole therein, and an annular flange having spaced slots therein; and said wheel comprising a tire receiving portion, a web secured to said tire receiving portion, spaced driving lugs adapted to fit within the spaced slots in said adaptor and extending radially inward from said web, a split locking ring disposed adjacent said spaced driving lugs and having an expansible coupling joining its free ends, and retaining means to hold said locking ring to the wheel when the ring is in the expanded position.

2. A vehicle wheel mounting adapted for use with a conventional brake drum assembly having outwardly extending lugs and a central outwardly extending hub, comprising an adaptor and a wheel, said adaptor including a plate having spaced lug receiving holes adapted to receive the lugs of the brake drum and a central hub receiving hole adapted to receive the central hub of the brake drum, and an annular flange having spaced slots therein, said flange being broader at its base than at its circumference to provide a tapered face portion; and said wheel comprising an annular tire receiving portion, a web secured to said tire receiving portion and extending radially inward from said tire-receiving portion, a split locking ring disposed adjacent said spaced driving lugs and having an expansible coupling joining its free ends, and retaining means to hold said locking ring to the wheel when the ring is in the expanded position.

3. A vehicle wheel mounting as claimed in claim 2 and further characterized in that the lower portion of said split locking ring is tapered on the outer side and the inner side of said split locking ring is flat to provide a secure seating of the ring when it is disposed with the flat side against the said driving lugs and the tapered portion against the tapered face of said flange.

4. A vehicle wheel mounting comprising an adaptor adapted for attachment to a conventional wheel support and further adapted to receive a detachable wheel, said adaptor having an annularly disposed ring seat thereon, and a wheel adapted to detachably fit on said adaptor and including a split locking ring retained thereon, said locking ring having its free ends joined by an expansible coupling and being adapted to fit within the ring seat on said adaptor in the locked position when said wheel is locked to said adaptor, said expansible coupling including a boss extending perpendicularly from each free end of said split locking ring and having holes therethrough, a first clevis pivoted to one of said bosses by a pin extending through the forks of the said clevis near the ends of the said forks and through the hole in said boss, a second clevis pivotally secured to the other boss by a pin extending through the clevis and the hole in said boss, said pin being of smaller diameter than the hole, and an adjusting member extended through the back of said second clevis in screw-threaded engagement therewith and adapted to engage said second boss, said second clevis being pivotally engaged with said first clevis.

JAMES C. LEWIS.

REFERENCES CITED

The following references are of record in the file of this patent:

UNITED STATES PATENTS

| Number | Name | Date |
| --- | --- | --- |
| 852,998 | Bridges | May 7, 1907 |
| 1,002,151 | Hill | Aug. 29, 1911 |
| 1,002,901 | Christman | Sept. 12, 1911 |
| 1,020,678 | Barker | Mar. 19, 1912 |
| 1,143,870 | Wade | June 22, 1915 |
| 1,402,440 | Putnam | Jan. 3, 1922 |
| 1,648,507 | Richie | Nov. 8, 1927 |
| 1,890,028 | Campbell | Dec. 6, 1932 |
| 1,911,898 | Johnson | May 30, 1933 |
| 2,210,451 | Galindo | Aug. 6, 1940 |
| 2,360,002 | Lewis | Oct. 10, 1940 |
| 2,513,032 | Lewis | June 22, 1950 |

FOREIGN PATENTS

| Number | Country | Date |
| --- | --- | --- |
| 581,264 | France | 1924 |